US009736619B2

(12) United States Patent
Kim et al.

(10) Patent No.: US 9,736,619 B2
(45) Date of Patent: Aug. 15, 2017

(54) METHOD AND APPARATUS FOR MTC IN A WIRELESS COMMUNICATION SYSTEM

(75) Inventors: Taehyeon Kim, Anyang-si (KR); Laeyoung Kim, Anyang-si (KR); Jaehyun Kim, Anyang-si (KR); Hyunsook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 300 days.

(21) Appl. No.: 14/116,653

(22) PCT Filed: May 11, 2012

(86) PCT No.: PCT/KR2012/003711
§ 371 (c)(1),
(2), (4) Date: Nov. 8, 2013

(87) PCT Pub. No.: WO2012/154005
PCT Pub. Date: Nov. 15, 2012

(65) Prior Publication Data
US 2014/0089442 A1 Mar. 27, 2014

Related U.S. Application Data

(60) Provisional application No. 61/484,676, filed on May 11, 2011, provisional application No. 61/591,959, (Continued)

(51) Int. Cl.
*H04W 4/00* (2009.01)
*H04L 12/24* (2006.01)
(Continued)

(52) U.S. Cl.
CPC ......... *H04W 4/005* (2013.01); *H04L 41/5054* (2013.01); *H04L 51/38* (2013.01);
(Continued)

(58) Field of Classification Search
CPC ..... H04L 51/38; H04L 41/5054; H04L 67/26; H04W 4/005; H04W 4/12; H04W 76/02; H04W 72/048; H04W 4/14
See application file for complete search history.

(56) References Cited

U.S. PATENT DOCUMENTS

2004/0157630 A1  8/2004  Monroe et al.
2005/0215271 A1  9/2005  Sim et al.
(Continued)

FOREIGN PATENT DOCUMENTS

CN  101175250 A  5/2008
CN  101616498 A  12/2009
(Continued)

OTHER PUBLICATIONS

3GPP TR 23.888 V1.5.0 (Oct. 2011) Release 11.*
(Continued)

*Primary Examiner* — Michael C Lai
(74) *Attorney, Agent, or Firm* — Birch, Stewart, Kolasch & Birch, LLP

(57) ABSTRACT

The present invention relates to a wireless communication system, and more particularly, to a method and apparatus for performing or supporting machine-type communications (MTC). A method for a terminal to establish a connection to a server according to one embodiment of the present invention comprises the steps of: receiving a triggering message including a triggering identifier from a network; and a step of requesting a data connection to the server using the triggering information contained in the triggering message. The triggering identifier can be set to a predetermined value for distinguishing the triggering message from other types of messages.

12 Claims, 6 Drawing Sheets

Related U.S. Application Data filed on Jan. 29, 2012, provisional application No. 61/556,275, filed on Nov. 6, 2011, provisional application No. 61/554,949, filed on Nov. 2, 2011, provisional application No. 61/504,299, filed on Jul. 4, 2011, provisional application No. 61/542,781, filed on Oct. 3, 2011.

(51) Int. Cl.
    *H04W 76/02*     (2009.01)
    *H04L 12/58*     (2006.01)
    *H04W 4/14*     (2009.01)
    *H04W 72/04*     (2009.01)
    *H04L 29/08*     (2006.01)

(52) U.S. Cl.
    CPC ........... *H04W 4/14* (2013.01); *H04W 72/048* (2013.01); *H04W 76/02* (2013.01); *H04L 67/26* (2013.01)

(56) References Cited

U.S. PATENT DOCUMENTS

| | | | |
|---|---|---|---|
| 2008/0102802 A1 | 5/2008 | Do et al. | |
| 2008/0273462 A1* | 11/2008 | Klish | H04L 63/0428 370/235 |
| 2010/0017832 A1* | 1/2010 | Wang | H04N 5/4401 725/109 |
| 2010/0144360 A1* | 6/2010 | Okuda | H04W 72/042 455/450 |
| 2010/0191608 A1* | 7/2010 | Mikkelsen | G06Q 30/0601 705/26.1 |
| 2010/0210245 A1* | 8/2010 | Kim | H04M 3/42382 455/412.1 |
| 2010/0273450 A1 | 10/2010 | Papineau et al. | |
| 2012/0257571 A1* | 10/2012 | Liao | H04W 4/005 370/328 |
| 2013/0115983 A1* | 5/2013 | Ronneke | H04L 51/38 455/466 |
| 2014/0220951 A1* | 8/2014 | Gumbrell | H04W 4/005 455/418 |
| 2014/0258434 A1* | 9/2014 | Hong | H04W 4/14 709/206 |

FOREIGN PATENT DOCUMENTS

| | | |
|---|---|---|
| CN | 101822034 A | 9/2010 |
| KR | 10-2006-0092528 A | 8/2006 |
| KR | 10-2010-0043255 A | 4/2010 |
| KR | 10-2011-0039860 A | 4/2011 |
| WO | WO 2006/088331 A1 | 8/2006 |

OTHER PUBLICATIONS

3GPP TSG-SA, "System Improvements for Machine-Type Communications (Release 11)", 3GPP TR 23.888 V1.2.0, Apr. 2011, pp. 1-111.

ACISION "MTC Triggering w/o MSISDN using MT SMS Addressing Formats," 3GPP TSG SA WG2 Meeting #84, SA WG2 Temporary Document, TD S2-111828, Bratislava, Slovakia, Apr. 11-15, 2011, pp. 1-5.

* cited by examiner

METHOD AND APPARATUS FOR MTC IN A WIRELESS COMMUNICATION SYSTEM

CROSS REFERENCE TO RELATED APPLICATIONS

This non-provisional application is a National Stage entry under U.S.C. §371 of International Application No. PCT/KR2012/003711 filed on May 11, 2012, which claims the benefit of U.S. Provisional Application Nos. 61/484,676 filed on May 11, 2011, 61/591,959 filed on Jan. 29, 2012, 61/556,275 filed on Nov. 6, 2011, 61/554,949 filed on Nov. 2, 2011, 61/504,299 filed on Jul. 4, 2011 and 61/542,781 filed on Oct. 3, 2011. The entire contents of all of the above applications are hereby incorporated by reference.

TECHNICAL FIELD

The present invention relates to a wireless communication system and, more particularly, to a method and apparatus for performing or supporting machine type communication (MTC).

BACKGROUND ART

Machine type communication (MTC) refers to a communication scheme between one or more machines and is also referred to as machine-to-machine (M2M) communication. Here, a machine refers to an entity which does not require direct human operation or intervention. For example, examples of the machine may include not only a device including a mobile communication module, such as a meter or a vending machine, but also a user equipment such as a smartphone which is capable of automatically accessing a network without operation/intervention of a user to perform communication. Various examples of such a machine are referred to as an MTC device or terminal in the present specification. That is, MTC refers to communication performed by one or more machines (that is, MTC devices) without human operation/intervention.

MTC may include communication (e.g., device-to-device (D2D) communication) between MTC devices and communication between an MTC device and an MTC application server. Examples of communication between an MTC device and an MTC application server include communication between a vending machine and a server, communication between a point of sale (POS) device and a server and an electric meter, and communication between a gas meter or a water meter and a server. MTC-based applications may include security, transportation, healthcare, etc.

DISCLOSURE

Technical Problem

As compared to a person-to-person communication method, MTC may transmit and receive a small amount of data among a large number of devices. Additionally, MTC is performed according to a predetermined period or only when a specific event occurs and may be infrequently performed. In consideration of this, an MTC device may be normally set to an offline state to minimize power consumption. Alternatively, even when an MTC device is in an online state, a connection for data transmission/reception (e.g., an Internet protocol (IP) connection) may not be established in order to minimize system resource consumption. That is, an IP address of an MTC device may not be available by a server or may not be reachable. In this case, in order to perform MTC, signaling for requesting or instructing the MTC device to establish the IP connection is necessary and such signaling may be a trigger indication for an MTC device. However, up to now, a method of triggering an MTC device has not been provided.

An object of the present invention devised to solve the problem lies in a method of accurately and efficiently performing MTC device triggering.

The technical problems solved by the present invention are not limited to the above technical problems and other technical problems which are not described herein will become apparent to those skilled in the art from the following description.

Technical Solution

The object of the present invention can be achieved by providing a method for a terminal to establish a connection with a server including receiving, from a network, a triggering message including a triggering indicator, and requesting a data connection with the server using triggering information included in the triggering message, wherein the triggering indicator is configured to have a value for distinguishing the triggering message from other types of messages.

In another aspect of the present invention, provided herein is a method for a network node to support a connection between a terminal and a server including requesting, from another network node, transmission of a triggering message including a triggering indicator to the terminal, wherein a data connection request from the terminal to the server is transmitted is transmitted using triggering information included in the triggering message, wherein the triggering indicator is configured to have a value for distinguishing the triggering message from other types of messages.

In a further aspect of the present invention, provided herein is a terminal device for establishing a connection with a server including a transceiving module for transmitting and receiving a signal to and from an external device, and a processor for controlling the terminal device, wherein the processor is configured to receive, from a network, a triggering message including a triggering indicator through the transceiving module; and to request a data connection with the server using triggering information included in the triggering message, wherein the triggering indicator is configured to have a value for distinguishing the triggering message from other types of messages In a further aspect of the present invention, provided herein is a network node for supporting a connection between a terminal and a server including a transceiving module for transmitting and receiving a signal to and from an external device, and a processor for controlling the network node, wherein the processor is configured to request, from another network node, transmission of a triggering message including a triggering indicator to the terminal through the transceiving module, wherein a data connection request to the server is transmitted is transmitted from the terminal using triggering information included in the triggering message, wherein the triggering indicator is configured to have a value for distinguishing the triggering message from other types of messages.

The embodiments of the present invention may include the following features.

The triggering may be requested when an Internet protocol (IP) address of the terminal is not available by the server.

The triggering indicator may correspond to a specific value of a predetermined field of the triggering message.

The triggering indicator may correspond to a predetermined port address number included in the triggering message.

The triggering message may be a short message service (SMS) message transmitted to the terminal.

Content of the SMS message including the triggering indicator may not be displayed.

The triggering information may include at least one of identification information of the server, access point name (APN) of the server, identification information of the terminal, application identification information, or service identification information.

The requesting of the data connection may include at least one of attaching to the server, establishing a packet data network (PDN) connection with the server, execution of an application related to the triggering information, or activation of a port of the application.

The triggering indicator may be allocated in an application-common or application-specific manner.

The triggering indicator may be allocated by a Machine Type Communication-InterWorking Function (MTC-IWF) or an MTC server.

The terminal may be an MTC device, and the server may be MTC application server.

It is to be understood that both the foregoing general description and the following detailed description of the present invention are exemplary and explanatory and are intended to provide further explanation of the invention as claimed.

Advantageous Effects

According to the present invention, it is possible to provide a method of accurately and efficiently performing MTC device triggering.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Figure 1:
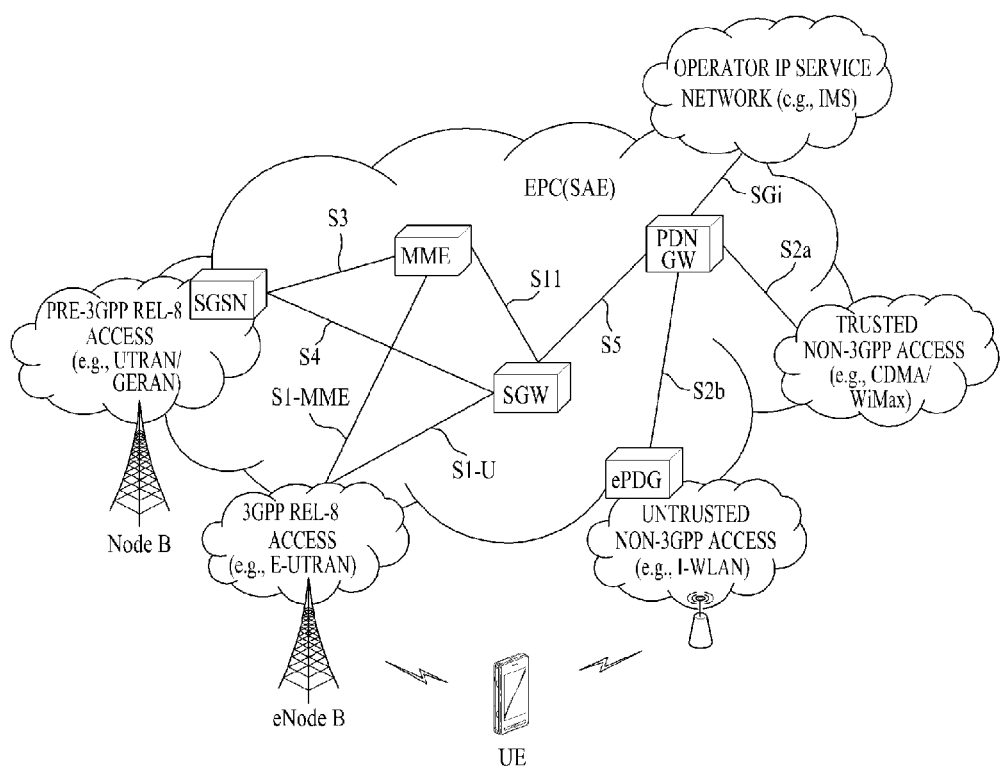
FIG. 1 is a diagram showing the schematic architecture of an evolved packet core (EPC)

The following embodiments are proposed by combining constituent components and characteristics of the present invention according to a predetermined format. The individual constituent components or characteristics should be considered optional factors on the condition that there is no additional remark. As required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by the standard documents disclosed in any one of wireless access systems, such as an IEEE 802 series system, a $3^{rd}$ Generation Partnership Project (3GPP) system, a 3GPP Long Term Evolution (LTE) and LTE-A system, and a 3GPP2 system. That is, the steps or portions, which are not described in order to make the technical spirit of the present invention clear, may be supported by the above documents. In addition, all the terms disclosed in the present document may be described by the above standard documents.

The following technologies may be used in various wireless communication systems. For clarity, a 3GPP LTE and 3GPP LTE-A system will be focused upon in the following description, but the scope of the present invention is not limited thereto.

Terminology used in the present specification is defined as follows.

UMTS (universal mobile telecommunication system): Third generation mobile communication technology based on global system for mobile communication (GSM) developed by 3GPP.

EPS (evolved packet system): Core network supporting an LTE access network, which is evolved from UMTS.

NodeB: Base station of a UMTS network, which is mounted outdoors and coverage of which forms a macro cell.

eNodeB: Base station of an EPS network, which is mounted outdoors and coverage of which forms a macro cell.

UE: User equipment. The UE may be referred to as terminal, mobile equipment (ME), mobile station (MS), etc. In addition, the UE may be a portable apparatus such as a laptop, a mobile phone, a personal digital assistant (PDA), a smartphone and a multimedia apparatus or a non-portable apparatus such as a vehicle mounted apparatus. A UE or terminal may indicate an MTC device in terms of MTC.

IMS (IP multimedia subsystem): Subsystem for providing a multimedia service based on IP.

IMSI (international mobile subscriber identity): User identifier internationally and uniquely assigned in a mobile communication network.

SIM (subscriber identifier module): Module including user information such as IMSI.

MTC (machine type communication): Communication performed by a machine without human intervention.

MTC device: UE (e.g., a vending machine, a meter, etc.) which has a communication function through a core network and serves a specific purpose.

MTC server: Server on a network for managing an MTC device, which may be located inside or outside a core network.

MTC application: Service to which MTC is applied (e.g., remote metering, product movement tracking, etc.).

MTC application server: Server on a network over which an MTC application is executed.

MTC feature: Function of a network supporting an MTC application. For example, MTC monitoring is a feature for preparing for equipment loss in an MTC application such as remote metering and low mobility is a feature for an MTC application for an MTC device such as a vending machine.

RAN (radio access network): Unit including a NodeB, an eNodeB and a radio network controller (RNC) for controlling the NodeB and the eNodeB in a 3GPP network, which is present between UEs and provides a connection to a core network.

HLR (home location register)/HSS (home subscriber server): Database having subscriber information in a 3GPP network. The HSS may perform functions such as configuration storage, identity management and user state storage.

RANAP (RAN application part): Interface between an RAN and a node for controlling a core network (mobility management entity (MME)/serving GPRS (general packet radio service) supporting node (SGSN)/mobile switching center (MSC)).

PLMN (public land mobile network): Network configured for the purpose of providing mobile communication services to individuals. This network may be configured on a per operator basis.

NAS (non-access stratum): Functional layer for exchanging signaling and traffic messages between a UE and a core network in a UMTS protocol stack. This supports mobility of the UE and supports a session management procedure for establishing and maintaining an IP connection between a UE and a PDN GW.

Hereinafter, a description will be given based on the above-described terminology.

FIG. 1 is a diagram showing the schematic architecture of an evolved packet core (EPC).

The EPC is a fundamental element of system architecture evolution (SAE) for improving performance of 3GPP technology. SAE corresponds to a research project for deciding a network structure supporting mobility between various types of networks. SAE aims to provide an optimized packet-based system which supports various radio access technologies based on IP and provides improved data transfer capabilities.

More specifically, the EPC is a core network of an IP mobile communication system for a 3GPP LTE system and may support a packet-based real-time and non-real-time service. In an existing mobile communication system (that is, a second or third generation mobile communication system), a core network function was implemented through two distinct sub-domains of a voice network (a circuit-switched (CS) network) and a data network (a packet-switched (PS) network). In a 3GPP LTE system which is evolved from the third generation communication system, sub-domains of a CS network and a PS network were unified into one IP domain. That is, in a 3GPP LTE system, a terminal having IP capability and a terminal may be connected through an IP based base station (e.g., an eNodeB (evolved Node B)), an EPC, an application domain (e.g., an IMS)). That is, the EPC is a structure necessary to implement an end-to-end IP service.

The EPC may include various components. FIG. 1 shows a serving gateway (SGW), a packet data network gateway (PDN GW), a mobility management entity (MME), a serving GPRS (general packet radio service) (SGSN) supporting node and an enhanced packet data gateway (ePDG).

The SGW operates as a boundary point between a radio access network (RAN) and a core network and is an element which performs a function for maintaining a data path between an eNodeB and a PDG GW. In addition, if a terminal moves over a region served by an eNodeB, the SGW serves as a local mobility anchor point. That is, packets may be routed through the SGW for mobility in an evolved UMTS terrestrial radio access network (E-UTRAN) defined after 3GPP release-8. In addition, the SGW may serve as an anchor point for mobility management with another 3GPP network (an RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an untrusted network such as an interworking wireless local area network (I-WLAN) and a trusted network such as a code division multiple access (CDMA) or WiMax network).

Although the SGW and the PDN GW are configured as separate gateways in the example of the network architecture of FIG. 1, the two gateways may be implemented according to a single gateway configuration option.

The MME performs signaling and control functions in order to support access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., GPRS networks).

The ePDG serves as a security node for an untrusted non-3GPP network (e.g., an I-WLAN, a Wi-Fi hotspot, etc.).

As described with reference to FIG. 1, a terminal having IP capabilities may access an IP service network (e.g., an IMS) provided by an operator through various elements in the EPC based on 3GPP access or non-3GPP access.

FIG. 1 shows various reference points (e.g., S1-U, S1-MME, etc.). In the 3GPP system, a conceptual link connecting two functions present in different functional entities of an E-UTRAN and an EPC is defined as a reference point. Table 1 shows the reference points shown in FIG. 1. In addition to the example of Table 1, various reference points may be present according to network architecture.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | Reference point between MME and SGSN. Enables user and bearer information exchange for inter 3GPP access network mobility in idle and/or active state. This reference point can be used intra-PLMN or inter-PLMN (e.g. in the case of Inter-PLMN HO). |
| S4 | Reference between SGW and SGSN. Provides related control and mobility support between GPRS Core and the 3GPP Anchor function of Serving GW. In addition, if Direct Tunnel is not established, it provides user plane tunneling. |
| S5 | Reference point for providing user plane tunneling and tunnel management between Serving GW and PDN GW. Used for Serving GW relocation due to UE mobility and if the Serving GW needs to connect to a non-co-located PDN GW for the required PDN connectivity. |
| S11 | Reference point between MME and SGW |
| SGi | Reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to a non-3GPP interface. S2a is a reference point for providing a user plane with related control and mobility support between the trusted non-3GPP access and the PDNGW. S2b is a reference point for providing a user plane with related control and mobility support between the ePDG and the PDNGW.

Figure 2:
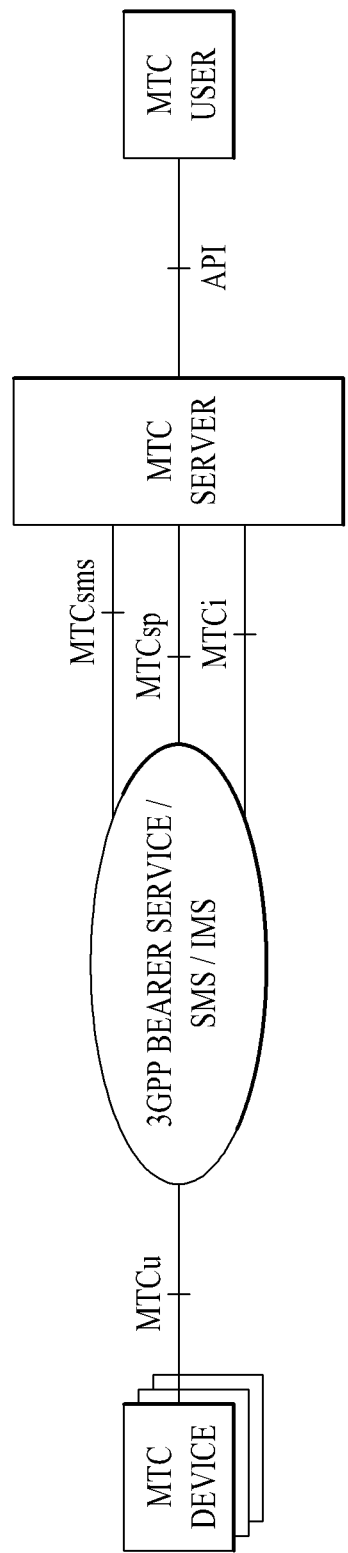
FIG. 2 is a diagram showing a $3^{rd}$ Generation Partnership Project (3GPP) service model supporting MTC.

FIG. 2 is a diagram showing a 3$^{rd}$ Generation Partnership Project (3GPP) service model supporting MTC. An MTC architecture defined in 3GPP may include an MTC device, an MTC server and an MTC user as shown in FIG. 2. In addition, the MTC server may be connected to a radio network via a 3GPP bearer service, a short message service (SMS) or an IMS (the bearer service means an end-to-end information delivery service from the viewpoint of a network, unlike an end-to-end connection from the viewpoint of a user). The MTC server performs communication with a radio network or with the MTC device via a radio network and may correspond to an MTC service platform for providing an access interface to an MTC user. The MTC user may access the MTC server via an application programming interface (API).

Table 2 below shows reference points of FIG. 2.

TABLE 2

| Reference point | Description |
| --- | --- |
| MTCu | It provides MTC Devices access to 3GPP network for the transport of user plane and control plane traffic. MTCu interface could be based on Uu (interface between a UE and a NodeB in WCDMA), Um (interface a mobile station (MS) and a base transceiver station (BTS) in GSM), Ww (interface between a UE and a WLAN access network) and LTE-Uu interface (interface between a UE and an eNodeB in LTE.) |
| MTCi | It is the reference point that MTC Server uses to connect the 3GPP network and thus communicates with MTC Device via 3GPP bearer services/IMS. MTCi could be based on Gi, Sgi, and Wi interface. |

TABLE 2-continued

| Reference point | Description |
| --- | --- |
| MTCsp | It is the reference point that the MTC Server uses for signaling with the 3GPP network. |
| MTCsms | It is the reference point that MTC Server uses to connect the 3GPP network and thus communicates with MTC Device via 3GPP SMS. |

As shown in FIG. 2, in an MTC network architecture defined in the current 3GPP standard, a method of utilizing an existing 3GPP bearer service was proposed. Additionally, a method of utilizing an SMS for data exchange between an MTC device and an MTC server was proposed. This considers characteristics of an MTC application for the purpose of transmitting/receiving small amounts of data such as metering information or product information. An existing SMS method and an IMS based SMS method may be used. In the example of FIG. 2, MTCsms is a data exchange interface using an existing SMS method and MTCi indicates a data exchange interface using an IMS based SMS method.

In the 3GPP standard, various methods for implementing MTC, such as a method of controlling a paging range for an MTC application with low mobility, have been proposed. However, communication between MTC devices (e.g., D2D communication) is not included in the current 3GPP standard. For this reason, although MTC operation between an MTC server and an MTC device is focused upon in the present invention, the present invention is not limited thereto. That is, the principle proposed by the present invention is equally applicable to MTC between MTC devices. As described above, although communication using a PS network is defined in association with MTC in 3GPP GSM/UMTS/EPS, this is merely exemplary. That is, the present invention is not limited to MTC using the PS network and is applicable to MTC using a CS network.

Figure 3:
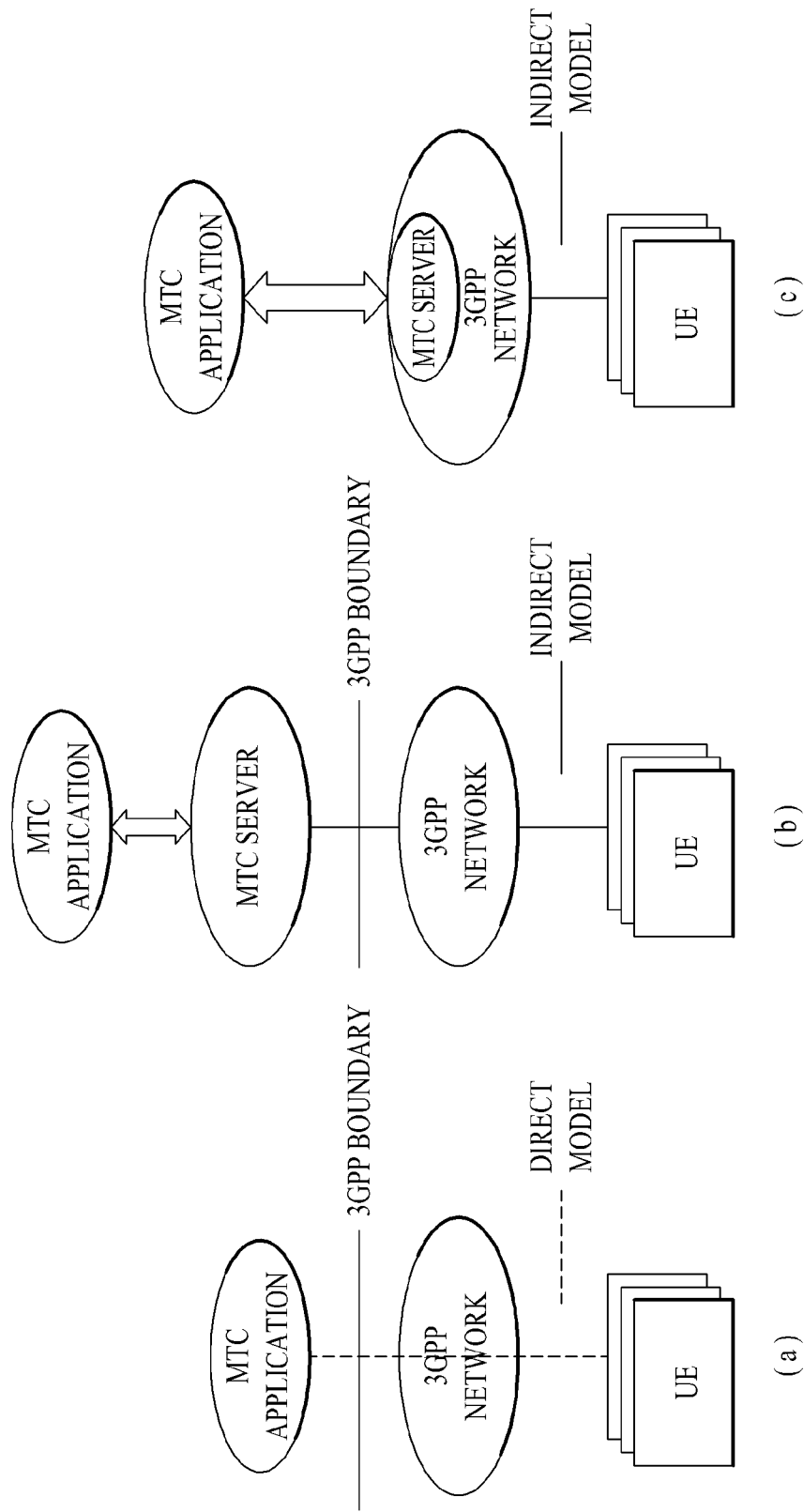
FIG. 3 is a diagram showing examples of an MTC communication model.

FIG. 3 is a diagram showing examples of an MTC communication model.

MTC applications are respectively executed in an MTC device and an MTC application server to interwork via communication using a network. At this time, various models of MTC traffic may be implemented depending upon what participates in communication between an MTC application and a 3GPP network. FIG. 3(a) shows a model in which communication is directly performed without an MTC server, FIG. 3(b) shows a model in which an MTC server (e.g., an SCS) is located outside a 3GPP network, and FIG. 3(c) shows a model in which an MTC server is located inside a 3GPP network. In addition, FIG. 3(a) corresponds to a direct communication scheme controlled by a 3GPP operator, FIG. 3(b) corresponds to a communication scheme controlled by a service provider, and FIG. 3(c) corresponds to a communication scheme controlled by a 3GPP operator.

The direct model of FIG. 3(a) shows that an MTC application directly performs communication with a UE (or an MTC device) with respect to a 3GPP network as an over-the-top (OTT) application.

The indirect model of FIGS. 3(b) and 3(c) shows that an MTC application indirectly performs communication with a UE (or an MTC device) using a supplementary service provided by a 3GPP network. More specifically, in the example of FIG. 3(b), the MTC application may use an MTC server for supplementary services provided by a third-party service provider (that is, service provider not responsible for 3GPP). The MTC server may perform communication with a 3GPP network through various interfaces. In the example of FIG. 3(c), the MTC application may use an MTC server for supplementary services provided by a 3GPP operator (which corresponds to a service provider). Communication between an MTC server and a 3GPP network is performed within a PLMN. In FIGS. 3(b) and 3(c), an interface between an MTC server and an MTC application is not included in the 3GPP standard.

Since the indirect models of FIGS. 3(a) and 3(b) are complementary, a 3GPP operator may combine the indirect models for different applications. That is, although not shown in FIG. 3, an MTC communication module may be implemented as a hybrid model in which a direct model and an indirect model are simultaneously used. For example, user plane connection may use a direct model and control plane signaling may use an indirect model.

Figure 4:
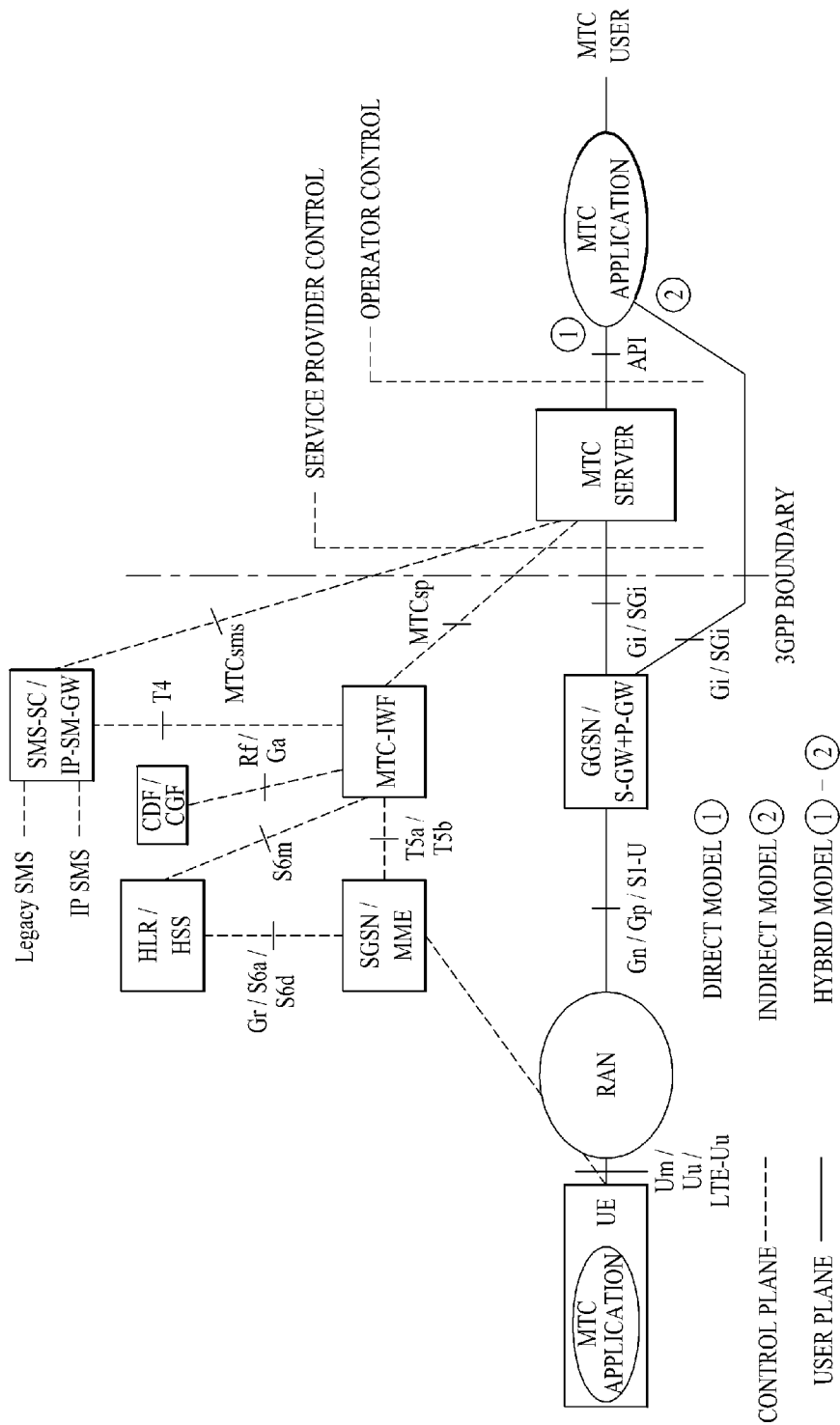
FIG. 4 is a diagram showing an exemplary model of an MTC architecture.

FIG. 4 is a diagram showing an exemplary model of an MTC architecture.

An end-to-end application between a UE (or an MTC device) used for MTC and an MTC application may use services provided by a 3GPP system and selective services provided by an MTC server. A 3GPP system may provide transport and communication services (including a 3GPP bearer service, an IMS and an SMS) including a variety of optimization services facilitating MTC. In FIG. 4, a UE used for MTC is connected to a 3GPP network (UTRAN, E-UTRAN, GERAN, I-WLAN, etc.) through a Um/Uu/LTE-Uu interface. The architecture of FIG. 4 includes various MTC models described with reference to FIG. 2.

First, entities shown in FIG. 4 will be described.

In FIG. 4, an MTC application server is a server on a network over which an MTC application is executed. Technologies for implementing various MTC applications are applicable to an MTC application server and a detailed description thereof will be omitted. In addition, in FIG. 4, the MTC application server may access an MTC server through a reference point API and a detailed description thereof will be omitted. Alternatively, the MTC application server may be co-located with an MTC server.

An MTC server is a server on a network for managing an MTC device and may be connected to a 3GPP network to communicate with nodes of a PLMN and a UE used for MTC.

An MTC-interworking function (IWF) may control interworking between an MTC server and an operator core network and serve as a proxy for MTC operation. In order to support an MTC indirect or hybrid model, one or more MTC-IWFs may be present in a home PLMN (HPLMN). The MTC-IWF may relay and interpret a signaling protocol on a reference point MTCsp to enable a PLMN to perform a specific function. The MTC-IWF may perform a function for authentication of an MTC server, a function for authentication of a control plane request from an MTC server, various functions associated with the below-described trigger indications, etc. before the MTC server establishes communication with a 3GPP network.

A short message service-service center (SMS-SC)/Internet protocol short message gateway (IP-SM-GW) may manage transmission and reception of an SMS. The SMS-SC serves to relay a short message between a short message entity (SME) (an entity for transmitting or receiving a short message) and a mobile station and storing and forwarding the short message. The IP-SM-GW may serve to perform protocol interworking between an IP based UE and an SMS-SC.

A charging data function (CDF)/charging gateway function (CGF) may perform a charging operation.

The HLR/HSS serves to store and provide subscriber information (IMSI, etc.), routing information, configuration information, etc. to the MTC-IWF.

An SGSN/MME may perform a control function such as mobility management, authentication, resource allocation, etc. for connection of a UE to a network. In association with the below-described triggering, the SGSN/MME may serve to receive a trigger indication from the MTC-IWF and process the trigger indication into the form of a message provided to the MTC device.

A gateway GPRS support node (GGSN)/serving-gateway (S-GW)+packet data network-gateway (P-GW) may serve as a gateway for connecting a core network to an external network.

Table 3 shows main reference points of FIG. 4.

TABLE 3

| Reference point | Description |
| --- | --- |
| MTCsms | It is the reference point an entity outside the 3GPP system uses to communicate with UEs used for MTC via SMS. |
| MTCsp | It is the reference point an entity outside the 3GPP system uses to communicate with the MTC-IWF related control plane signaling. |
| T4 | Reference point used by MTC-IWF to route device trigger to the SMS-SC in the HPLMN. |
| T5a | Reference point used between MTC-IWF and serving SGSN. |
| T5b | Reference point used between MTC-IWF and serving MME. |
| S6m | Reference point used by MTC-IWF to interrrogate HSS/HLR for E.164 MSISDN or external identifier mapping to IMSI and gather UE reachability and configuration information. |

User plane communication with an MTC server in case of the indirect and hybrid model and communication with an MTC application server in case of the direct and hybrid model may be performed using a conventional protocol through Gi and SGi.

For details associated with description of FIGS. 2 to 4, refer to 3GPP TS 23.888, which is incorporated herein by reference.

MTC Device Triggering

In case of MTC, it is expected that MTC devices greater in number than the number of UEs may reside on a network. Accordingly, minimum network resource use, minimum signaling use, minimum power consumption, etc. are required.

In addition, an MTC device may not normally establish an IP connection with an MTC application server for minimum system resource use. If the MTC device does not establish the IP connection and thus data transmission from the MTC application server to the MTC device fails, the MTC application server may request or instruct the MTC device to establish the IP connection. This may be referred to as trigger indication. That is, MTC device triggering is required when an IP address of an MTC device is not available by the MTC application server or is unreachable (a certain entity or an IP address of the entity unreachable means that message delivery fails because the entity is not present at that address). The MTC device may receive a trigger indication from a network and establish communication with the MTC application server if the trigger indication is received. The MTC device may receive the trigger indication, a) if the MTC device is offline, b) if the MTC device is online but a data connection is not established or c) if the MTC device is online and a data connection is established.

MTC device triggering may mean an operation of enabling the MTC device to establish an IP connection with the MTC application server using a triggering message if the IP connection (or a PDN connection) capable of receiving data from the MTC application server at the MTC device is not established (if the MTC device may receive a fundamental control signal but may not receive user data). The triggering message may be a message including information (hereinafter, referred to as triggering information) for enabling the network to route a message to an appropriate MTC device and enabling the MTC device to route the message to an application in an appropriate MTC device. A method of distinguishing a message including triggering information from other types of messages at the MTC device is necessary. Such a method will be described in the detailed embodiments of the present invention.

Upon design of MTC triggering proposed by the present invention, an existing wireless communication system should not be changed or influence of MTC triggering on an existing wireless communication system should be minimized even if the existing wireless communication system is changed. Since new operation such as MTC device triggering may be performed while maintaining backward compatibility with existing wireless communication systems, technical or economical costs consumed to introduce the technologies proposed by the present invention may be minimized.

Hereinafter, MTC communication between an MTC device and an MTC application server via a core network will be described by way of various examples of the present invention for MTC triggering operation. Although, in the following description of the present invention, a 3GPP access technology (e.g., 3GPP GSM/UMTS/EPS) based mobile communication system is described, the present invention is not limited thereto and is applicable to MTC operation in various wireless communication systems.

In addition, in the following description, assume that a terminal may be registered with several MTC servers. In addition, device triggering supports a data connection between an MTC application server and an MTC device. Such device triggering may be performed by a request transmitted from the MTC application to network nodes (e.g., an MTC server or a proxy server (e.g., MTC-IWF of FIG. 4). That is, triggering may be performed when a data connection between the MTC application server and the MTC device is not established and triggering operation may be mainly described in terms of operation performed by network node(s) and operation performed by the MTC device. Here, the proxy server may serve as a gateway for transmitting a control signal or data for MTC via a 3GPP network including an EPS or an IMS. In addition, when supporting a triggering function, an appropriate triggering method or path may be selected according to connection state, configuration, capability, etc. of the MTC device.

Embodiment 1

In the present embodiment, examples of a triggering process when an MTC device is offline or online will be described.

In the case in which the MTC device (or a terminal) is in an offline state, assume that position information of the MTC device is registered with a network and then is switched to an offline state. In this case, an MTC server may transmit triggering information directly or via a proxy server (e.g., an MTC-IWF). The proxy server may interrogate an HLR/HSS as to the online/offline state of the MTC device. If the MTC device is in the offline state, the triggering information may be transmitted using a cell broadcast service (CBS) or an SMS. The triggering information may include information (access point name (APN) information, a service ID, an application ID, etc.) necessary for the MTC device to establish a PDN connection. That is, the proxy server may deliver the triggering information to the MTC device using the CBS or the SMS. The triggered MTC device may select an appropriate APN from the triggering information and attempt an attachment process. If the attachment process is successful, the PDN connection may be established and the MTC device may be connected to an MTC application server based on the PDN connection. Thus, the MTC application server may transmit data to the MTC device.

Alternatively, the MTC device may be normally in the offline state and may be periodically turned on to listen to a broadcast channel such as a CBS channel or a paging channel during a predetermined period, thereby acquiring the triggering information. That is, if the broadcast information includes triggering information, the MTC device may attempt the attachment process based on the triggering information. Additionally, the MTC device may check whether the position thereof has been changed and perform the above-described operation if the position thereof has not been changed. If the position of the MTC device has been changed, the MTC device may attempt to attach to a changed cell and update position information. Accordingly, the MTC server may determine a network node to which the triggering information will be transmitted. If such broadcast triggering information is used, it is possible to easily manage a group of MTC devices.

If the triggering operation is applied when the MTC device is in the online state, the MTC device may establish only the PDN connection or may establish a CS connection but may not establish a PDN connection. At this time, the MTC device may be in the online state by registering position information thereof with the network via an attachment process or a tracking area update (TAU) process. The MTC server may send, to the proxy server (e.g., MTC-IWF), an external identifier (a Mobile station international subscriber directory number (MSISDN), fully qualified domain name (FQDN) (similar to an email address), a uniform resource identifier (URI), etc.) of the MTC device to request triggering of the MTC device. The proxy server may interrogate the HLR/HSS as to the online/offline state of the MTC device and then select a path used to transmit the triggering information. For example, a PDN GW may be used if the identifier of the MTC device is an IP address, an IMS path may be used if the identifier of the MTC device is a session initiation protocol (SIP) URI or an EPS path, an SMS path or a PDN GW may be used if the identifier of the MTC device is an IMSI. If the MTC device, which has received the triggering information via the path selected by the proxy server, does not establish the PDN connection, the MTC device may establish the PDN connection for communication with the MTC application server and access the MTC application server via the PDN connection. Thus, the MTC application server may transmit data to the MTC device.

Embodiment 2

Hereinafter, detailed examples of the present invention for the triggering process will be described. Embodiment 2 is applicable to both cases in which the MTC device described in Embodiment 1 is offline and online. That is, the online/ offline state of the MTC device may correspond to the case in which the IP address of the MTC device is not available by the MTC application server or is unreachable. In this case, the following MTC triggering is applicable.

The triggering information may be transmitted via an SMS or non-access stratum (NAS) message. In addition, the MTC server may start triggering. That is, a message for delivering the triggering information from the MTC server to the MTC device may be an SMS or NAS message. Hereinafter, a description will be given with reference to FIG. 4.

For example, in case of triggering using an SMS, the MTC server may request SMS transmission from an SMS-SC via an MTCsms interface. That is, the MTC server may request SMS transmission from the SMS-SC and deliver an SMS message including triggering information to the MTC device. Thus, the triggering information may be delivered via a legacy SMS transmission process defined in an existing wireless communication system or an IP SMS transmission process. For details of the legacy SMS or IP SMS transmission process, refer to 3GPP TS 23.040, which is incorporated by reference.

As another example, in case of triggering using an SMS, the MTC server does not directly request SMS transmission from the SMS-SC but may request triggering message transmission via an MTC proxy server (e.g., an MTC-IWF). That is, the MTC server may request triggering information transmission from the MTC-IWF via an MTCsp interface, the MTC-IWF may create triggering information in the form of an SMS and request SMS transmission from the SMS-SC via a T4 interface. Thus, the triggering information may be transmitted to the MTC device via the legacy SMS or IP SMS transmission process.

As another example, in case of triggering using a NAS message, the MTC server may request triggering message transmission via a proxy server (e.g., an MTC-IWF). That is, the MTC server may request triggering information transmission from the MTC-IWF via an MTCsp interface and the MTC-IWF may request NAS message transmission from the SGSN/MME via a T5-series interface (T5a/5b). Thus, the SGSN/MME may transmit the triggering information to the MTC device via the NAS message received from the MTC-IWF.

Embodiment 2-1

Detailed examples of the present invention for triggering information transmission using an SMS will now be described.

The above-described triggering method using the SMS is applicable without modifying SMS transmission operation (flow) defined in an existing radio communication network. According to existing SMS processing, an SMS receiver displays SMS data on a screen. If an SMS including triggering information is not distinguished from an existing SMS, data of the SMS including the triggering information may be displayed on the screen or abnormal operation may be performed due to undefined information. In this case, even if the triggering information is transmitted via the SMS, the above-described triggering operation (that is, the MTC device attempt to establish the IP connection) may not be performed. Accordingly, an indicator (or an identifier) for distinguishing the SMS including the triggering information from the existing SMS needs to be defined. A terminal (or an MTC device) which has received an SMS may search for an indicator indicating MTC device triggering, may not display SMS data if the indicator is found, may extract MTC device triggering information, and may attempt to establish an IP connection.

The SMS defined for triggering information transmission is defined as an SMS-mobile terminated (MT) message and may be designed using an SMS-DELIVER type. The SMS-DELIVER type is a transfer protocol data unit (TPDU) including user data (that is, a short message) and defines an SMS type transmitted from a server (SC) to a mobile station (MS). Table 4 below shows fundamental elements of the SMS-DELIVER type.

TABLE 4

| TPDU (TP) parameter | Mandatory/ Optional | Indication | Description |
| --- | --- | --- | --- |
| TP-MTI (TP-Message-Type-Indicator) | Mandatory | 2 bits | Parameter describing a message type |
| TP-MMS (TP-More-Messages-to-Send) | Mandatory | 1 bit | Parameter indicating whether a message to be transmitted is present |
| TP-LP (TP-Loop-Prevention) | Optional | 1 bit | Parameter indicating an SMS application for which automatic message generation or delivery causing an infinite loop should be prevented |
| TP-RP (TP-Reply-Path) | Mandatory | 1 bit | Parameter indicating that a relay path is present |
| TP-UDHI (TP-User-Data-Header-Indicator) | Optional | 1 bit | Parameter indicating that a TP-UD field includes a header |
| TP-SRI (TP-Status-Report-Indication) | Optional | 1 bit | Parameter indicating that an SME requests a status report |
| TP-OA (TP-Originating-Address) | Mandatory | 2-12 octet | Address of an originating SME |
| TP-PID (TP-Protocol-Identifier) | Mandatory | 1 octet | Parameter for identifying a higher layer protocol if a higher layer is present |
| TP-DCS (TP-Data-Coding-Scheme) | Mandatory | 1 octet | Parameter for identifying a coding scheme in a TP-UD |
| TP-SCTS (TP-Service-Centre-Time-Stamp) | Mandatory | 7 octet | Parameter for identifying when an SC receives a message |
| TP-UDL (TP-User-Data-Length) | Mandatory | integer | Parameter indicating the length of a TP-UD field |
| TP-UD (TP-User-Data) | Optional | According to TP-DCS | User data |

Such an SMS may be created in the MTC server, the proxy server (e.g., the MTC-IWF) or the SMS-SC. Hereinafter, a detailed method of allocating, to an MTC device (or a terminal), an identifier for distinguishing an MT message carrying triggering information from other types of messages will be described.

Embodiment 2-1-1

The present embodiment relates to a method of allocating a reserved state of a specific field among elements used for header information of an SMS MT message in order to identify a triggering information SMS message. For example, in a specific field having a size of 2 bits, assume that states 00 and 01 have predetermined meaning but states 10 and 11 are reserved. In this case, one of the reserved bit states may be defined to indicate a triggering information SMS. Alternatively, a bit state of a specific field defined to have a predetermined meaning may be reused to indicate a triggering information SMS. Alternatively, a bit state indicating a triggering information SMS may be added to a specific field. For example, among elements of the MT message, a TP-PID field, a TP-UDHI field, a TP-UD field, etc. may be used. The scope of the present invention is not limited to SMS-DELIVER in an SMS MT message or a specific field of an MT message and is applicable to an arbitrary (element (or field)) of an arbitrary MT message.

As an example, the case of using a TP-PID field will be described. The TP-PID may be used for the purpose of referring to a protocol of a higher layer which is currently being used or for the purpose of interworking with a telematics device. The TP-PID field is defined to have a size of 1 octet (that is, 8 bits) and, for example, 10xxxxxx (x is any value between 0 and 1) corresponds to a reserved value. The reserved value may be modified or added to the TP-PID and may be used as an identifier of a device triggering message. For example, if the MT message includes a TP-PID field having a value of 10xxxxxx, this indicates that the MT message carries MTC device triggering information.

Additionally, the MTC device triggering identifier defined using the reserved value of the TP-PID field may be allocated on a per MTC application basis (that is, in an application-specific manner). For example, an MT message having a TP-PID value of 10001000 may be interpreted as a triggering message related to a remote metering application and an MT message having a TP-PID value of 10001111 may be interpreted as a triggering message related to a movement tracking application. Alternatively, the above-described identifier may function as an MTC device triggering identifier without distinction of MTC application (that is, in an application-common manner). In this case, information (e.g., an application ID, etc.) indicating for which MTC application triggering is performed should be additionally included in a payload of a triggering message. Such additional information is applicable to SMS operation without change (transparent to nodes which participate in SMS operation).

As another example, the case of using a TP-UD field will be described. In case of TP-UD, a variety of information elements may be specified and used as a user data header region. If the value of a TP-UDHI is 0, this indicates that the TP-UD includes only short-message information without a header and, if the value of a TP-UDHI is 1, this indicates that a header is added to a start part of the TP-UD. Application port addressing or port address number in a data header region may be used to route the SMS to one of several applications, similarly to transmission control protocol (TCP)/user datagram protocol (UDP) operation. For example, in case of an 8-bit address, values (or port numbers) from 0 to 239 are reserved and, in case of a 16-bit address, values (or port numbers) from 49152 to 65535 are reserved. A reserved value of a port address number in the data header of the TP-UD may be modified or added and used as an identifier of a device triggering message. For example, if the 8-bit port address number of the data header of the TP-UD of the MT message has a value of 1xx, this may indicate that the MT message carries MTC device triggering information.

Additionally, the MTC device triggering identifier defined using the reserved value of application port address in the data header of the TP-UD field may be allocated on a per MTC application basis. For example, if the port address value of the data header is 110, the MT message may be interpreted as a triggering message related to a remote metering application. If the port address value of the data header is 120, the MT message may be interpreted as a triggering message related to a movement tracking application. Alternatively, the above-described identifier may function as an MTC device triggering identifier without distinction of MTC application. In this case, information (e.g., an application ID, etc.) indicating for which MTC application triggering is performed should be additionally included in a payload of a triggering message. Such additional information is applicable to SMS operation without change (transparent to nodes which participate in SMS operation).

As described above, a message including an identifier indicating an MTC device triggering message in a predetermined field (e.g., a TP-PID field or application port addressing of a data header region of a TP-UD field) of an SMS header may be created by the MTC server, the proxy server (e.g., MTC-IWF) or the SMS-SC. That is, the MTC server may indicate that the SMS is used to trigger the MTC device or request MTC device triggering from the MTC-IWF or the MTC-IWF may indicate that the SMS is used to trigger the MTC device or request MTC device triggering from the SMS-SC. For indication or requesting, a specific interface is used between the MTC server and the MTC-IWF or between the MTC-IWF and the SMS-SC and a predetermined message indicating MTC device triggering may be transmitted or a predetermined indicator may be transmitted in a state of being included in the message. When the SMS-SC transmits an SMS message (e.g., an SMS-DELIVER message) to the MTC device (or the terminal), the MTC device triggering identifier may be indicated using a specific (reserved) value of the above-described predetermined field. That is, in the above-described embodiment, the protocol between the SMS-SC and the terminal (or the MTC device) may be modified and existing SMS transmission operation may be performed without change except that the SMS-SC receives the request of the MTC server or the MTC-IWF and inserts the MTC device triggering identifier (or indicator) into the SMS. In addition, the terminal may check the identifier, check the MTC device triggering message, and attempt to execute an application (or to establish an IP connection) according to the triggering information included in the message. Accordingly, the above-described method is applicable to existing SMS operation without change (or is transparent to nodes which participate in SMS operation without influence).

Embodiment 2-1-2

The present embodiment relates to a method of deciding a format of a TP-UD region corresponding to an actual message of an SMS MT message such that a triggering information SMS message is identified. For example, the TP-UD region of the SMS is divided into first and second regions. The first region may be set as an indicator (or identifier) region indicating an MTC device triggering SMS message and the second region may be set as a data region. For example, the first region (that is, the indicator region) may be set to a specific value (e.g., a reserved value) to indicate that the MT message is an SMS carrying triggering information. In addition, the value of the first region (that is, the indicator region) may be assigned on a per MTC application basis. Alternatively, the first region (that is, the indicator region) may function as an MTC device triggering identifier without distinction of MTC application. In this case, information (e.g., an application ID, etc.) indicating for which MTC application triggering is performed should be additionally included in a payload of a triggering message. Such additional information is applicable to SMS operation without change (transparent to nodes which participate in SMS operation).

As described above, the actual message part (that is, the TP-UD region) of the SMS may be divided into the indicator region and the data region and a message indicating an MTC device triggering message via the indicator region may be created by the MTC server, the proxy server (e.g., MTC-IWF) or the SMS-SC. That is, the MTC server may indicate that the SMS is used to trigger the MTC device or request MTC device triggering from the MTC-IWF or the MTC-IWF may indicate that the SMS is used to trigger the MTC device or request MTC device triggering from the SMS-SC. Thus, the SMS-SC may transmit, to the MTC device (or the terminal), the message in which the specific part of the TP-UD region is set as the indicator region, as described above. That is, in the above-described embodiment, the protocol between the SMS-SC and the terminal (or the MTC device) may be modified and existing SMS transmission operation may be performed without change except that the SMS-SC sets the specific part of the TP-UD region as the identifier region and inserts the MTC device triggering indicator according to the request of the MTC server or the MTC-IWF. In addition, the terminal may check the identifier, check the MTC device triggering message, and attempt to execute an application (or to establish an IP connection) according to the triggering information included in the message. Accordingly, the above-described method is applicable to existing SMS operation without change (or is transparent to nodes which participate in SMS operation without influence).

Embodiment 2-2

Detailed examples of the present invention for triggering information transmission via a NAS message will now be described.

In case of NAS message, an SMS may be transmitted in a state of being included in the NAS message. That is, MTC device triggering using the NAS message may be performed by transmitting the NAS message including the SMS carrying triggering information. The SMS message including the MTC device triggering indicator (or identifier) described in Embodiment 2-1 may be transmitted in a state of being included in the NAS message. In this case, this method does not influence (is transparent to) operations of network nodes related to transmission of the NAS message including the SMS including the triggering indicator as compared to existing NAS message transmission operation.

Alternatively, the MTC device triggering indicator may be included in the NAS message. The SGSN/MME may receive the triggering information from the proxy server (e.g., the MTC-IWF) and transmit the NAS information including triggering information and a triggering indicator to the terminal (or the MTC device). More specifically, according to the method similar to the method of using the SMS described in Embodiment 2-1, the MTC device triggering indicator may be included in a specific part of the NAS message (e.g., a specific value (or a reserved value) of a header region of the NAS message or a specific part of a data region of the NAS message). Since the principle described in Embodiment 2-1 is applicable to the present embodiment, a detailed description of the present embodiment will be omitted.

Alternatively, a new type of NAS message in which triggering information is added to a NAS message as a specific IE may be defined such that the new type of NAS message is identified as a triggering message without a separate triggering indicator. In this case, a specific type of NAS message may be identified as a message including triggering information without distinction of MTC application. In this case, information indicating a specific MTC application may be included in triggering information. Alternatively, a specific value may be specified as triggering information on a per MTC application basis.

The terminal (or the MTC device), which has received the message including the triggering information (or the triggering identifier and the triggering information) according to the various above-described embodiments of the present invention, may execute an application indicated by the triggering information or activate a port corresponding thereto in order to transmit and receive packet data (or IP packet data). Here, activation means that a PDN connection is established to generate a user plane or data transmitted to a control plane is extracted and written in a communication buffer to be used by the application.

An existing terminal, which cannot recognize the message including the triggering information (or the triggering identifier and the triggering information) newly defined in the present invention, may identify the triggering message as meaningless message (e.g., an SMS including information which cannot be interpreted by the terminal) and may ignore the message or may not process the message, thereby preventing abnormal operation.

Embodiment 3

The present embodiment relates to an example of a process of transmitting and receiving an MTC device triggering message, to which the above-described various embodiments of the present invention are applicable.

Figure 5:
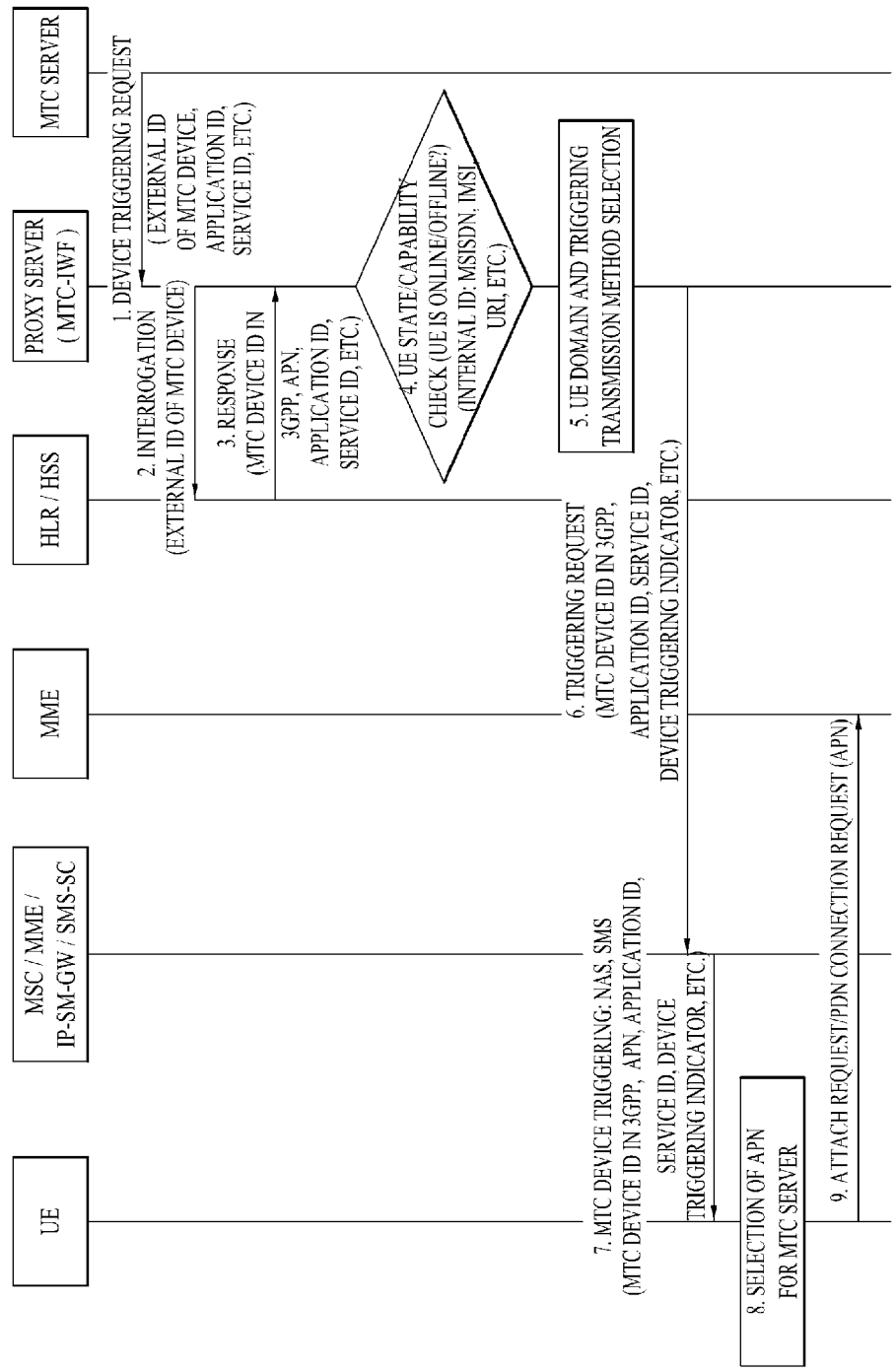
FIG. 5 is a flowchart illustrating a process of transmitting and receiving an MTC device triggering message according to an embodiment of the present invention.

FIG. 5 is a flowchart illustrating a process of transmitting and receiving an MTC device triggering message according to an embodiment of the present invention.

In step 1, an MTC server may transmit a UE (or MTC device) triggering request to a proxy server. An MTC application server (not shown) may request triggering from the MTC server after the MTC application server has failed data transmission to the MTC device. For example, if the MTC application server determines that an IP connection with a specific UE is not established, the MTC application server may request triggering from the MTC server so as to perform triggering. The proxy server may be an MTC-IWF or a gateway, for example. The triggering request of the MTC server including an external identifier of the UE may be transmitted to the proxy server. The triggering request may be transmitted to a final UE in a state of being included in an application identifier (ID) and/or a service ID.

More specifically, the triggering request in step 1 may be provided in the form of "UE application triggering request" information by a network server (e.g., a device management server which corresponds to the MTC server of FIG. 5) for performing triggering for a connection (e.g., a PDN connection) with the MTC application server. The UE application triggering request, for example, includes at least one of the following items: target UE (e.g., MTC device) identification information, identification information of an application, a TCP (or UDP) port and/or IP address (or FQDN) of a server/application to be contacted by a UE, application-specific information (the size thereof may be limited), a request counter (which may be used to detect a repeated request, to associate a request with ACK, and to enable an application to cancel a request), an urgent request indication or a validity timer (which may be used to delete storage information of a UE application which is no longer necessary).

In step 2, the proxy server may interrogate an HLR/HSS on information about the UE. Here, the proxy server may transmit, to the HLR/HSS, information (e.g., an external ID of the MTC device) received from the MTC server in step 1. In addition, the proxy server may transmit the address of the MTC server to the HLR/HSS as necessary.

In step 3, the HLR/HSS may transmit the information about the UE to the proxy server as a response. The information about the UE may include registered position information of the UE, information about the state (online or offline state) of the UE, an ID of the MTC device in 3GPP, APN information necessary for the UE to access the MTC application server, an application ID, a service ID, etc.

In steps 4 and 5, the proxy server may determine an MTC device triggering transmission method in consideration of the information about the UE. More specifically, the proxy server may check the state and capabilities of the UE and determine a supportable UE domain and triggering transmission method with respect to the UE. For example, the proxy server may determine whether an IP address is not available by the MTC application server or is unreachable (for example, whether the US is offline or is online in a CS domain but is offline in a PS domain (that is, whether a PDN connection is not established), etc.) in association with the online/offline state of the UE. In addition, MTC device triggering may be transmitted via a PDN GW path if the identifier of the UE is an IP address, via an IMS path if the identifier of the UE is an SIP URI, and via an EPS, SMS or PDN GW path if the identifier of the UE is an IMSI.

In step 6, the proxy server may transmit the triggering request to an entity which will transmit a triggering message to the UE. The entity which will transmit the triggering message to the UE may be one of an MSC, a CBS server, an SGSN/MME, an IP-SM-GW or an SMS-SC and may be determined according to the triggering transmission method determined in steps 4 and 5. For example, in case of the triggering method using the SMS, the proxy server may transmit the triggering request to the SMS-SC such that the SMS-SC transmits an SMS including triggering information to the UE. Alternatively, in case of a triggering method using a NAS message, the proxy server may transmit the triggering request to the SGSN/MME such that the SGSN/MME transmits a NAS message including triggering information to the UE. Alternatively, in case of a triggering method using a CBS, the triggering request may be transmitted to the CBS server and the CBS server may instruct the eNB to broadcast an SMS to the UE (not shown).

The triggering request transmitted from the proxy server to the triggering message transmission entity may include the ID of the MTC device in 3GPP, an APN, an application ID, a service ID, a device triggering indicator, etc. In association with the device triggering indicator, in case of a triggering method using an SMS, the proxy server (e.g., the MTC-IWF) may allocate, to the UE, an appropriate identifier (e.g., a port address number) for distinguishing an MT message carrying triggering information from other types of messages. Additionally, the identifier may be transmitted to the triggering message transmission entity (e.g., the SMS-SC). The device triggering indicator may be included in a triggering message according to the various methods of Embodiment 2. The SMS including triggering information and the device triggering indicator for preventing the UE from displaying the content of the SMS on the screen and performing operation corresponding to triggering may be created and transmitted to the UE. The SMS may be created by the proxy server (e.g., the MTC-IWF) or the SMS-SC as described above.

In step 7, the triggering message transmission entity may transmit the message including triggering related information received from the proxy server to the UE. In case of the SMS, the SMS-SC may transmit the SMS including the triggering information to the UE and, in case of the NAS message, the SGSN/MME may transmit the NAS message including the triggering information to the UE. In addition, the message including the triggering related information may include the ID of the MTC device in 3GPP, an APN, an application ID, a service ID, a device triggering indicator (e.g., a port address number), etc.

In steps 8 and 9, the UE may recognize that the message includes the triggering information based on the triggering indicator or the message type included in the received message. In case of the message including the triggering information, the UE may perform operation for executing an application and activating a corresponding port according to the triggering information. The message may include a device ID of a UE, APN information, an application ID, a service ID, etc. and the UE may select an appropriate APN based on the information. The UE may attempt an attachment process based on the selected APN, attempt to establish a PDN connection or request a service. The attachment process or the request for the PDN connection may be performed with respect to an MME and may correspond to initial operation for establishing an IP connection with the MTC application server. For example, if the UE is in the offline state or if the UE is in the online state only in a CS domain and is in the offline state in a PS domain, an attachment process may be attempted in order to establish the IP connection with the MTC application server. If the attachment process has been completed, the PDN connection is established. The UE may access the MTC application server based on the established PDN connection. Accordingly, the MTC application server may transmit data to the UE (or the MTC device).

The above-described embodiments of the present invention may be independently applied or two or more of the above-described embodiments may be simultaneously applied.

Figure 6:
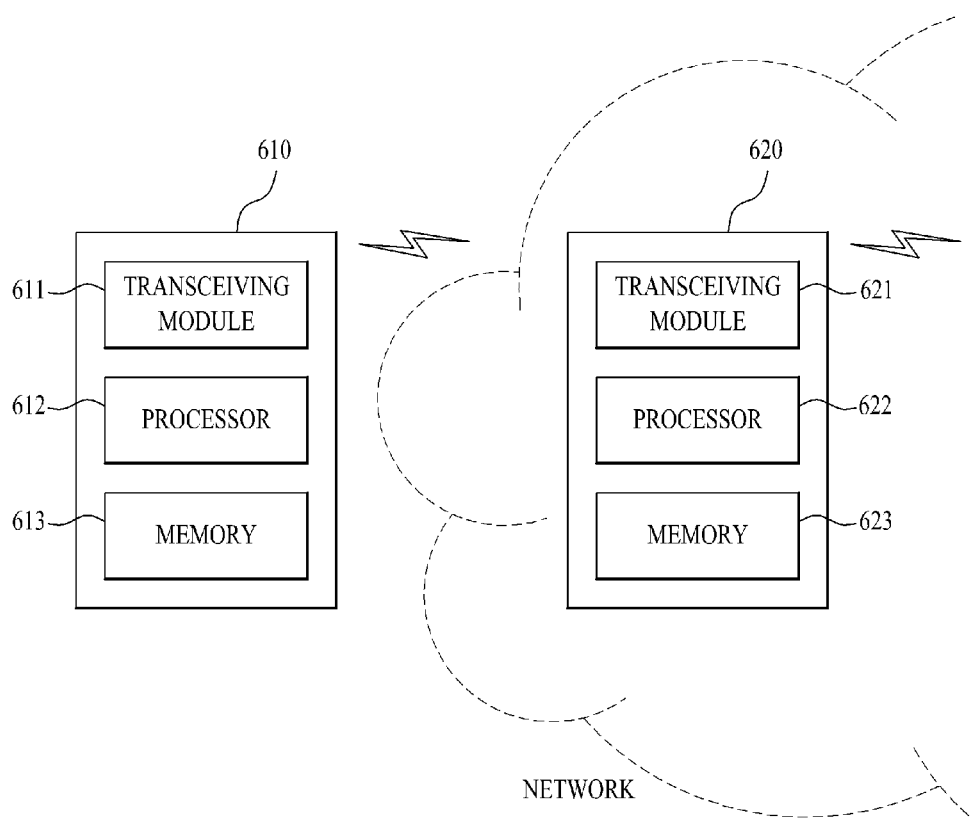
FIG. 6 is a diagram showing the configuration of a server device and a terminal device according to an embodiment of the present invention.

FIG. 6 is a diagram showing the configuration of a terminal device and a network node device according to an embodiment of the present invention.

Referring to FIG. 6, the terminal device 610 according to the present invention may include a transceiving module 611, a processor 612 and a memory 613. The transceiving module 611 may be configured to transmit various signals, data and information to an external device (e.g., a network node 620 and/or a server device (not shown)) and receive various signals, data and information from an external device (e.g., a network node 620 and/or a server device (not shown). The processor 612 may control overall operation of the terminal device 610 and may be configured to perform a function for processing information transmitted from the terminal device 610 to an external device or from an external device to the terminal device 610. The memory 613 may store the processed information for a predetermined time and may be replaced by a buffer (not shown).

The terminal device 610 according to the embodiment of the present invention may be configured to establish a connection with the server (e.g., the MTC application server). The processor 612 of the terminal device 610 may be configured to receive a triggering message including a triggering indicator from a network via the transceiving module 611. Here, triggering maybe requested if the IP address of the UE (e.g., the MTC device) is not available by the server (e.g., the MTC application server) or is unreachable and the triggering message may be transmitted from the network to the UE.

The processor 612 may be configured to request a data connection with the server (e.g., the MTC application server) using the triggering information included in the triggering message. The triggering information may include information (an IP address, a TCP/UDP port number, an APN, etc.) of the server, identification information of the UE, application identification information or service identification information. The request for the data connection may include attaching to the server, execution of an application related to the triggering information or activation of a port of an application.

The triggering indicator may be configured to have a predetermined value for distinguishing the triggering message from other types of messages. The triggering indicator may correspond to a specific value of a predetermined field of the triggering message. The triggering indicator may correspond to a port address number. The triggering message may be an SMS message (e.g., an SMS-MT message). The content of the general SMS message may be displayed but the content of the SMS message including the triggering indicator may not be displayed. The triggering indicator may be allocated in an application-common or application-specific manner. The triggering indicator may be allocated by the MTC-IWF.

Referring to FIG. 6, the network node device 620 according to the present invention may include a transceiving module 621, a processor 622 and a memory 623. The transceiving module 621 may be configured to transmit various signals, data and information to an external device (e.g., the terminal device 610, a server device (not shown) and/or another network node device) and receive various signals, data and information from an external device (e.g., the terminal device 610, a server device (not shown) and/or another network node device). The processor 622 may control overall operation of the network node device 620 and may be configured to perform a function for processing information transmitted from the network node device 620 to an external device or from an external device to the network node device 620. The memory 623 may store the processed information for a predetermined time and may be replaced by a buffer (not shown).

The network node device 620 (e.g., the MTC server or the proxy server (e.g., the MTC-IWF) according to one embodiment of the present invention may be configured to support a connection between the UE and the server (e.g., the MTC application server). The processor 622 of the network node device 620 may be configured to request, from another network node, transmission of a triggering message including a triggering indicator to the terminal device 610 via the transceiving module 621. For example, the network node device 620 may correspond to the MTC server or the proxy server (e.g., the MTC-IWF). The terminal device 610 may correspond to the MTC device and the server (not shown) may correspond to the MTC application server. In addition, another network device may correspond to an SMS-SC/IP-SM-GW, an MSC, or an SGSN/MME. The triggering indicator may be configured to have a predetermined value (e.g., a port address number) for enabling the terminal device 610 to distinguish the triggering message from other types of messages.

The server (e.g., the MTC application server) may request the triggering message from the network node device 620 (e.g., the MTC server or the MTC-IWF) if the IP address of the UE is not available by the server (e.g., the MTC application server) or is unreachable such that the triggering message may be transmitted to the terminal device 610.

The embodiments of the present invention may be independently or simultaneously applied to the detailed configuration of the terminal device 610 and the network node device 620 and a description thereof will be omitted for clarity.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so as to be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Additionally, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The embodiments of the present invention are applicable to various mobile communication systems.

The invention claimed is:

1. A method of establishing a connection with a server by a terminal within a home public land mobile network (HPLMN), the method comprising:
   receiving, by the terminal from a node within the HPLMN, a short message service (SMS) message for initiating communication with the server;
   routing at least a portion of the SMS message to a triggering function within the terminal based on a triggering identifier within a payload of the SMS message, when the triggering identifier within the payload of the SMS message contains a value that is used to distinguish the SMS message from any other types of SMS messages; and
   requesting, by the triggering function within the terminal, a data connection with the server using the payload included in the SMS message when the triggering identifier within the payload of the SMS message is determined to contain the value that is used to distinguish the SMS message from any other types of SMS messages,
   wherein the triggering identifier is allocated to the terminal by a Machine Type Communication-Interworking Function (MTC-IWF).

2. The method according to claim 1, wherein the receiving the SMS message comprises receiving the SMS message when an internet protocol (IP) address of the terminal is not available to the server.

3. The method according to claim 1, wherein the value that is used to distinguish the SMS message from any other types of SMS messages is a value of a predetermined bit of a predetermined field of the SMS message.

4. The method according to claim 3, wherein the predetermined field is a transport protocol-protocol identifier field (TP-PID).

5. The method according to claim 1, wherein the SMS message contains triggering information that includes at least one of an identification information of the server, an access point number name (APN) of the server, identification information of the terminal, and service identification information.

6. The method according to claim 1, wherein the requesting the data connection comprises at least one of attaching to the server, establishing a packet data network (PDN) connection with the server, execution of an application related to a triggering information, and activation of a port of the application.

7. The method according to claim 1, wherein the triggering identifier is an application-common triggering indicator or application-specific triggering indicator.

8. The method according to claim 1, wherein the terminal is an MTC device and the server is an MTC application server.

9. The method according to claim 1, wherein a first region of the SMS message is set as an application port identifier region indicating the SMS message for device triggering, and a second region of the SMS message is set as a data region, the first region being set to a specific value to indicate that the SMS message is for carrying triggering information.

10. The method according to claim 1, wherein the SMS message includes at least one of an identification information of the server, an access point number name (APN) of the server, identification information of the terminal, application identification information, and service identification information.

11. A terminal configured to establish a connection with a server in a home public land mobile network (HPLMN), the terminal comprising:
    a communication device; and
    a processor operatively connected to the communication device and configured to:
      receive a short message service (SMS) message for initiating communication with the server from a node within the HPLMN,
      route at least a portion of the SMS message to a triggering function within the terminal based on a triggering identifier within a payload of the SMS message, when the triggering identifier within the payload of the SMS message contains a value that is used to distinguish the SMS message from any other types of SMS messages, and
      control the triggering function to request a data connection with the server using the payload included in the SMS message when the triggering identifier within the payload of the SMS message is determined to contain the value that is used to distinguish the SMS message from any other types of SMS messages,
      wherein the triggering identifier is allocated to the terminal by a Machine Type Communication-Interworking Function (MTC-IWF).

12. The terminal of claim 11, wherein the payload of the SMS message further includes an application identifier that identifies an application to be triggered within the terminal.

* * * * *